United States Patent

Hunt et al.

[11] Patent Number: 5,385,049
[45] Date of Patent: Jan. 31, 1995

[54] PIPELINE PIG AND METHOD OF PIPELINE INSPECTION

[76] Inventors: Hugh E. M. Hunt, Trinity College, Cambridge CB2 1TQ; Uwe G. Köpke, Emmanuel College, Cambridge CB2 3AP, both of England

[21] Appl. No.: 64,155

[22] PCT Filed: Nov. 22, 1991

[86] PCT No.: PCT/GB91/02070
§ 371 Date: May 18, 1993
§ 102(e) Date: May 18, 1993

[87] PCT Pub. No.: WO92/09847
PCT Pub. Date: Jun. 11, 1992

[30] Foreign Application Priority Data

Nov. 22, 1990 [GB] United Kingdom ............... 9025394

[51] Int. Cl.⁶ .................. F17D 5/00; G01M 7/00; E21B 47/022
[52] U.S. Cl. ........................... 73/592; 73/866.5
[58] Field of Search .............. 73/866.5, 865.8, 592, 73/623

[56] References Cited

U.S. PATENT DOCUMENTS

| | | | |
|---|---|---|---|
| 3,122,015 | 2/1964 | Shapiro et al. | 73/592 |
| 4,353,257 | 10/1982 | Vrba et al. | 73/592 X |
| 4,382,383 | 5/1983 | de Buda et al. | 73/592 |
| 4,541,278 | 9/1985 | Marsh et al. | 73/592 |
| 4,717,875 | 1/1988 | Lara | 324/220 |
| 5,038,614 | 8/1991 | Bseisu et al. | 73/592 |

FOREIGN PATENT DOCUMENTS

336828 10/1989 European Pat. Off. .
2146772 4/1985 United Kingdom .

*Primary Examiner*—Tom Noland
*Attorney, Agent, or Firm*—Watson, Cole, Grindle & Watson

[57] ABSTRACT

A pipeline inspection apparatus includes a pipeline pig which has a shaker for causing the pig to vibrate in one or more of the vertical, longitudinal, lateral, bending and torsional senses. The vibrations are transmitted into the wall of a pipeline through which the pig is moved and the vibration response of the pipeline is measured by accelerometers in the pig for detecting one or more of the vertical, longitudinal, lateral, bending and torsional motions of the pig. A data acquisition system and computer are used. For displaying and/or recording the measured data in a form which can be used to identify variations in the structural condition of the pipeline.

12 Claims, 7 Drawing Sheets

PIPELINE PIG AND METHOD OF PIPELINE INSPECTION

BACKGROUND OF THE INVENTION

The present invention relates to a method of inspecting pipelines such as gas pipelines and to a pipeline pig for use in such a method.

Pipeline inspection is important in order to investigate the integrity of pipelines and, if possible, enable warning of possible failure to be given well in advance of such failure so that pre-emptive measures can be taken to avoid it or mitigate its results. A particular problem arises with buried gas pipelines where fracture may have dire consequences.

Figure 12:
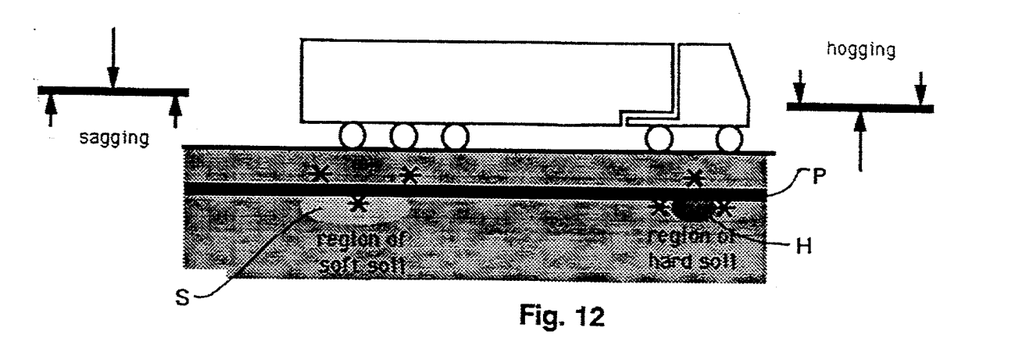
FIG. 12 is a view showing a pipeline underground with possible fracture points indicated.

There have been many proposals for pigs and methods that can monitor the structural condition of a pipeline, including pigs which have optical sensors or cameras, pigs with ultrasonic transducers and the like, but the results achieved with such devices are not always satisfactory, at least partly, because the results achieved may not give any indication of surrounding features in the ground which may lead to fracture in due course. FIG. 12 illustrates a buried gas pipeline P which passes over regions of soft S and hard H soil, where conditions vary greatly from those immediately surrounding them. The passage of heavy vehicles such as that shown at V will eventually cause sagging at region S and hogging at region H as indicated in the two small diagrams to each side of the main figure. Fracture is ultimately likely to occur at points marked *.

GB-A-2146772 proposes using a pig to strike the wall of a pipeline to introduce reverberant vibratory signals into the pipeline and then listening to the resultant reverberations and detecting preselected characteristics of the received sound to indicate unsupported sections or points of load or stress.

SUMMARY OF THE INVENTION

The present invention sets out to provide a way of overcoming problems with the prior art methods used and uses the fact that the structural condition of a pipeline, buried or otherwise, can be indicated by the resistance of the pipeline to translation and torsional movement. Structural conditions that may require to be detected include: changes in pipeline material, wall thickness or cross-sectional shape; type and integrity of joints, tees, branches and other fittings, and, particularly, the method and integrity of support (which includes, for the case of buried pipelines, surrounding ground material).

According to the present invention, a method of monitoring the structural condition of a pipeline and its support includes the steps of:

traversing the interior of a pipeline with a pig;

causing the pig to vibrate in one or more of the vertical, longitudinal, lateral, bending and torsional senses;

transmitting the vibrations into the wall of the pipeline;

measuring the vibration response of the pipeline by detecting one or more of the vertical, longitudinal, lateral, bending and torsional motions of the pig; and displaying and/or recording the measured data in a form which can be used to identify variations in the structural condition of the pipeline and its support. Bending may be in either the pitching plane (vertical) or the Yawing plane (horizontal) and is used throughout this specification to mean in either plane.

If desired, the vibrational motion of a further trailing pig can also be monitored to provide further data.

The invention also includes a pipeline pig having:

means for causing the pig to vibrate in one or more of the vertical, longitudinal, lateral, bending and torsional senses;

means for transmitting the vibrations into the wall of the pipeline;

means for measuring the vibration response of the pipeline by detecting one or more of the vertical, longitudinal, lateral, bending and torsional motions of the pig; and inspection apparatus also includes means for displaying and/or recording the measured data in a form which can be used to identify variations in the structural condition of the pipeline.

Preferably, the vibration, which is of low amplitude, is caused by an electromagnetic shaker or by counter-rotating masses and is transmitted at low amplitude through feet to the pipeline wall. The prototype pig is sufficiently rigid that it has no resonances within a range of vibrational frequencies from 0 to 500 Hz. The upper limit frequency is determined by the frequency range in which the pipeline is known to respond to vibration in a way that reflects the condition of the surrounding supporting medium. For 4" (100 mm) cast iron pipe buried underground. A suitable frequency range is 50 to 450 Hz.

The pig preferably has feet and weight distribution arranged to ensure stability and reduce turning motion during towing through a pipeline, but may have wheels or other support that is sufficiently stiff.

The apparatus may also include a further pig attached to the first pig so as to follow it when it is drawn through a pipeline, the second pig also having means for measuring the vibration response of the pipeline by detecting one or more of the vertical, longitudinal, lateral and torsional motions of the second pig in response to vibrations generated in the first pig. For convenience, the second pig may be identical to the first.

Other accelerometers may also be used to measure vibration generated by the pig. These are not attached to the pig or to the trailing pig, but rather these are attached to a fixed point in the pipeline (for instance at its end) or fixed to the surface of the ground above the estimated location of the pig in the pipe. Such accelerometers can give information regarding transmission paths that supplement data collected by the pig and any attached trailing pig.

The vibration signals sensed in response can be interpreted using frequency response functions (FRF's) which can then be used to display colour contour plots on a computer screen or printed by a colour printer for example.

BRIEF DESCRIPTION OF THE DRAWINGS

One example of a pipeline pig apparatus according to the invention, and the method in which it is used, will now be described with reference to the accompanying drawings, in which.

DESCRIPTION OF THE INVENTION

Figure 1:
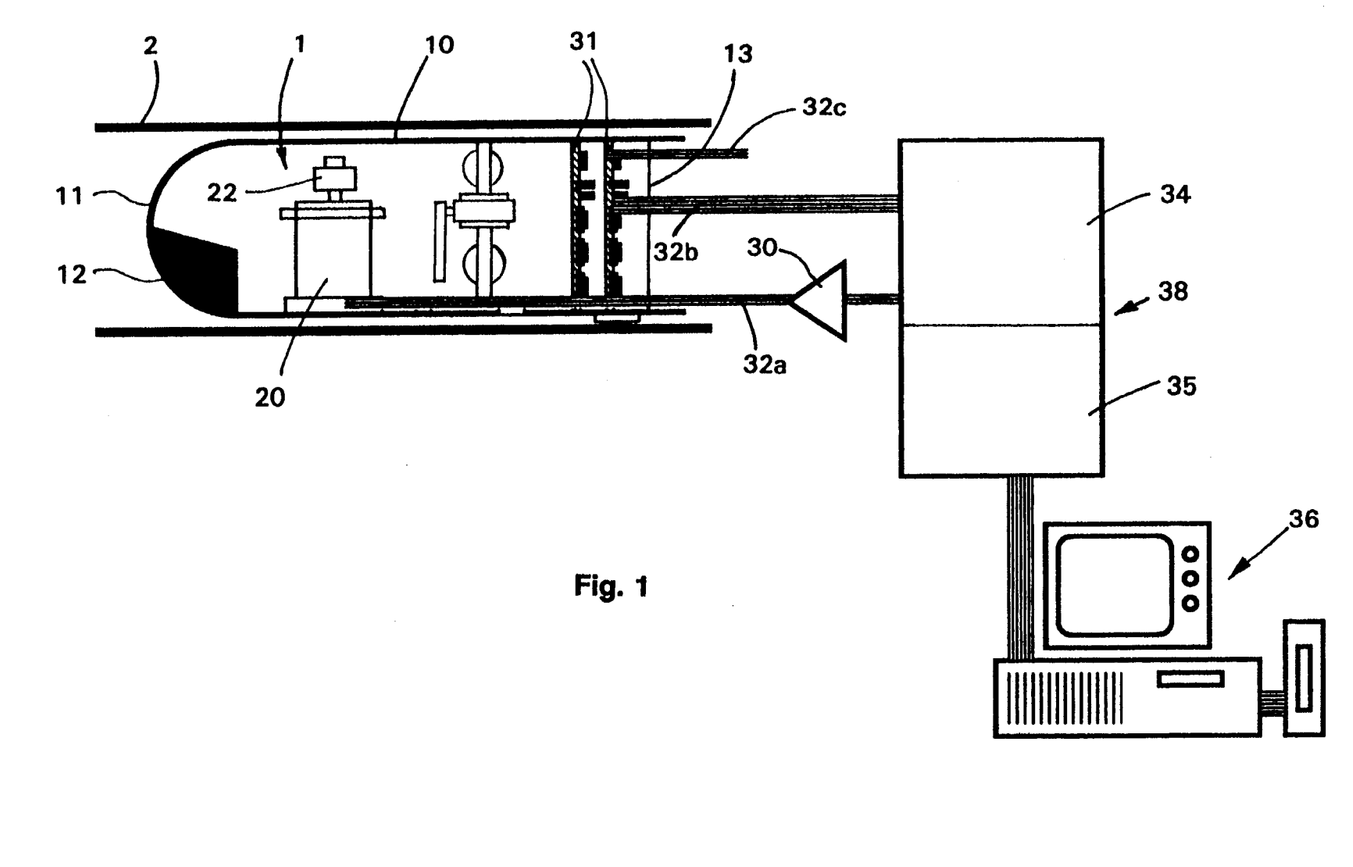
FIG. 1 is generalised schematic view of pipeline inspection apparatus including a pig and pipeline shown in axial section.
Figure 2:
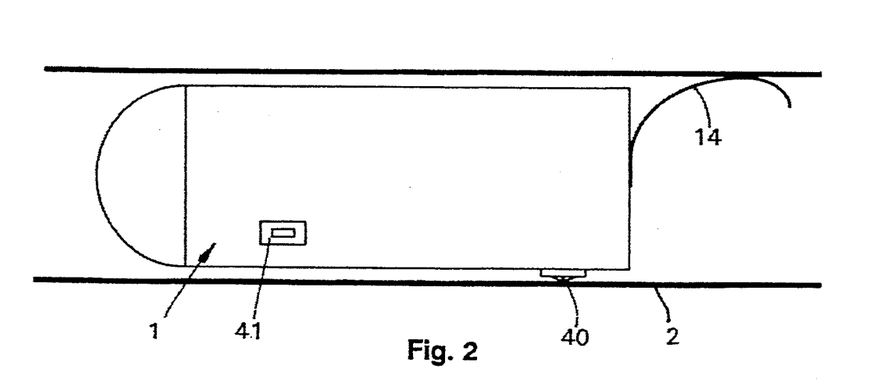
FIG. 2 is a side elevation of the pig with the pipeline shown in section.
Figure 3:
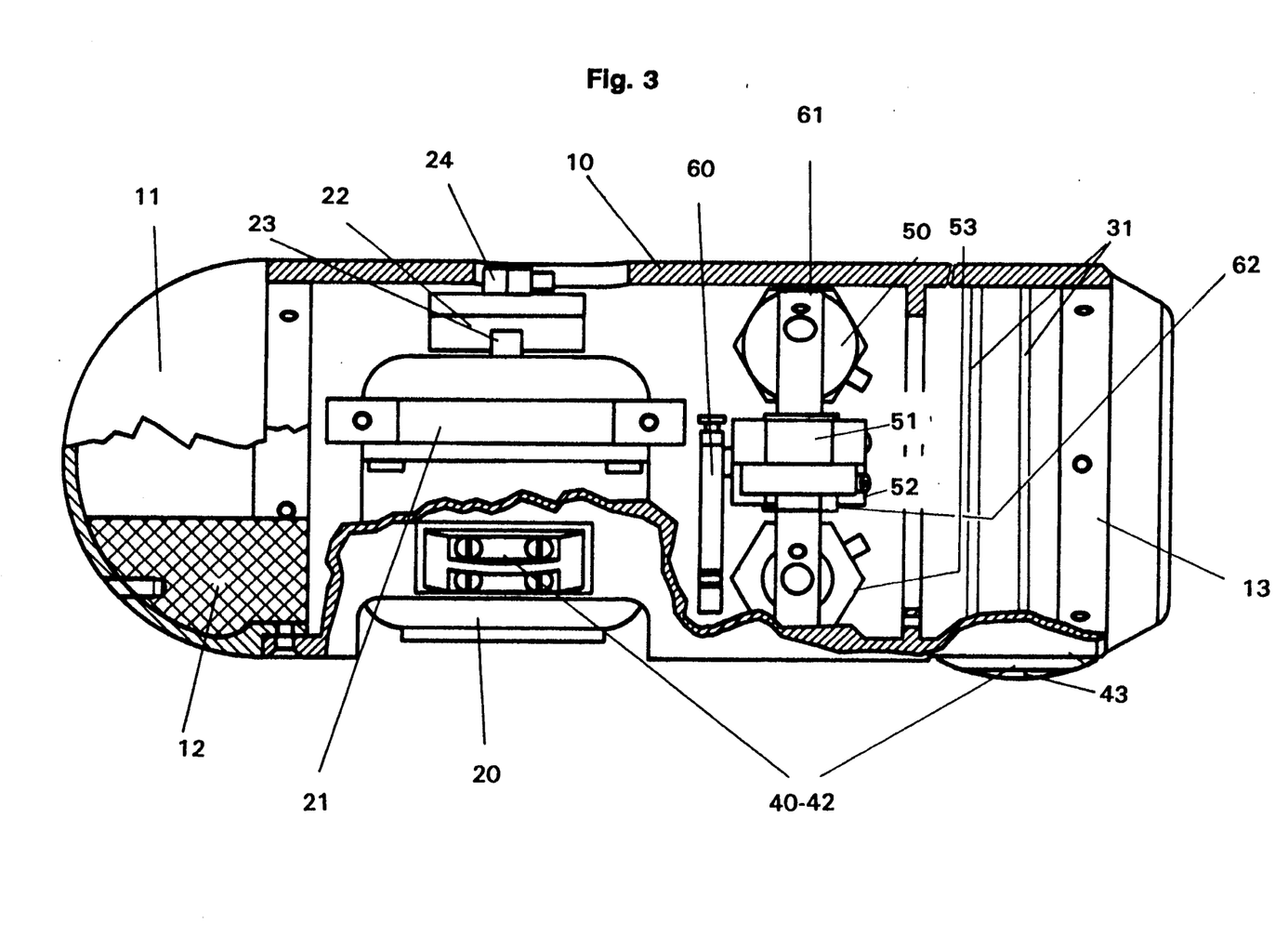
FIG. 3 is a detailed axial section through the pig.

The pig 1 is shown inside a pipeline 2 and is formed from an aluminium alloy tubular casing 10 and has a domed front 11 which houses a lead weight 12, and a rear end cover plate 13. Inside the tubular housing are mounted the various components of the pig, including an electromagnetic shaker 20 (LTV V47 from Ling Dynamic Systems) which, in the present example is designed to produce vibration in the vertical sense. Alternatively or additionally, plural shakers could be used to produce vibrations in the longitudinal, lateral, bending and/or torsional senses. The shaker 20 is mounted on a yoke-like support 21 secured to the wall of the tubular casing. A 100 g brass weight 22 is fixed to a vibrating spindle 23 of the shaker and in turn an accelerometer 24 is fixed to the vibrating weight 22 so that the amplitude of the vibrating force can be calculated during use. This is necessary because the force amplitude generated by the electromagnetic shaker is not related in a simple way to the current which drives it. The amplitude and frequency of the force generated and causing the required vibration, is determined by the current supplied to the pig via a shielded single-core cable 32a. The current source is a power amplifier 30 located outside the pipeline. The power amplifier is in turn driven or controlled by a voltage supplied from a data acquisition system 38 (to be described later). Any arbitrary vibratory wave form may be prescribed, whether transient or steady state.

An alternative (not shown) to the use of electromagnetic shakers would be to use off-centre masses on counter-rotating shafts, this providing a more compact means of obtaining the required vibration. The amplitude of vibration is related directly to the square of the rotational speed and the magnitude of the offset masses and it is only possible to generate sinusoidal vibrations. Transverse and torsional vibration may be generated from the same unit by adjusting the relative phases between the rotating shafts.

In use, vibration, whether transient or steady state, is produced by the shaker 20 over a frequency range of 50 to 450 Hz. This upper limit of frequency is determined by the lowest natural resonance of the pig as described below and will thus vary depending on the precise construction of any given pig. The lower limit is determined by the low frequency response of the shaker weight 22 on its suspension and this occurs at about 35 Hz. The vibration is transmitted to the walls of the pipeline through three convex feet 40-42 which make contact with the bottom of the pipeline 2. The feet lie at the vertices of an isosceles triangle whose axis of symmetry, when projected onto a horizontal plane, is aligned with the longitudinal axis of the pipeline and the longitudinal axis of the pig. A single rear foot 40 is at the apex of the triangle (beneath the axis of the pipeline) and two front feet 41,42 lie further forwards within a vertical plane which is perpendicular to the longitudinal axis of the pipeline. The feet have convex surfaces 43 and are formed of case hardened steel in order to reduce wearing of the feet, the convex surfaces allowing them to slide over surface irregularities within the pipeline 2.

The force required to produce measurable pipeline motion, which has an amplitude of about 5N, is substantially smaller in amplitude than the weight force of the pig itself (30.9N), the mass of the pig being 3.15 kg, and it is not therefore necessary to anchor the pig to the inside of the pipeline in any elaborate fashion. However, a pair of springs 14 (see FIG. 2) are provided as shown in order to hold down the rear of the pig. The pig is designed robe dynamically rigid over the working frequency range of 0 to 500 Hz. With this frequency range, there are no mechanical resonant frequencies which might cause distortion of vibrations within the pig. The pig and the pipeline therefore move as one, so that the motion of the pipeline can be monitored from within the pig by four accelerometers 50-53.

A second pig (not shown) known as 'the trailing pig' (and which may be substantially the same as the main pig for simplicity), may be used to measure vibration in the same way as does the pig which contains the source of excitation. This trailing pig is used to measure the response of the pipeline at a distance along the pipeline from the source of excitation so as to detect, for instance, the attenuation of vibration transmission along the pipeline that is characteristic of a lead-yarn or other types of joint. The use of the second pig is optional.

The pig is designed to remain upright within the pipeline 2 as it is towed by a rope along the pipeline. (The pig could be self-propelled if desired). This is achieved as follows. For a pipeline of circular cross section, the distribution of mass within the pig (which includes the ballast dome 11 at the front end) is chosen so that the centre of gravity is directly beneath an imaginary line which extends from the point at which the rear foot 40 contacts the pipeline 2 to the point which lies at the intersection of the centre-line of the pipeline and the vertical plane which contains the points of contact of the front two feet 41,42 with the pipeline. The distance of the centre of gravity below this line is maximised for maximum stability. In the present example, the centre of gravity lies above the front two feet 41,42 and below the centre-line of the pipeline. In this case, the contact force at the rear foot 40 is close to zero and the additional light springs 14 are provided at the rear end to maintain sufficient contact force. Each spring 14 is formed from a strip of spring steel.

A pendulum 60 is connected to an armature 61 of a potentiometer 62 and, on rotation, is used to generate a voltage which indicates the axial rotation of the pig. This voltage is transmitted to the data acquisition system 38 through a 6-core data cable 32b for verification that the pig remains upright. No measurement is taken unless the pig is vertical within ±5°. Although not presently incorporated in the design, the measured angle could be used to modify the results obtained to take account of orientation.

Figure 9:
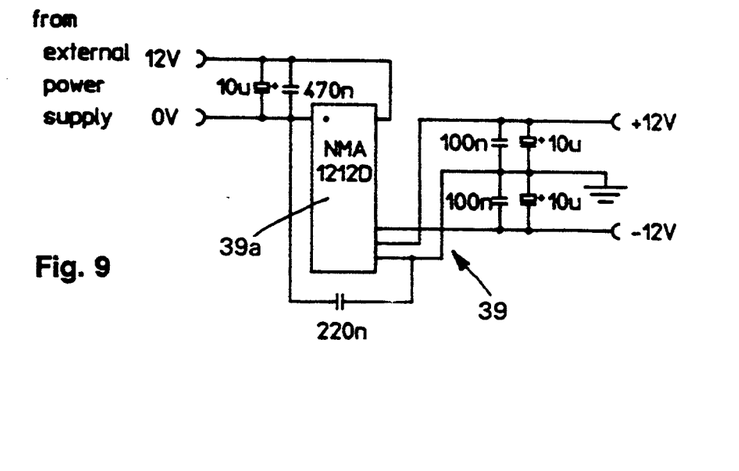
Figure 10:
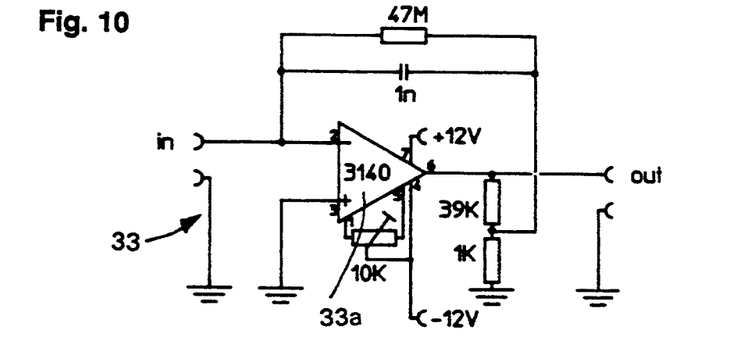
FIG. 10 is a circuit diagram of a charge amplifier used by each accelerometer.
Figure 11:
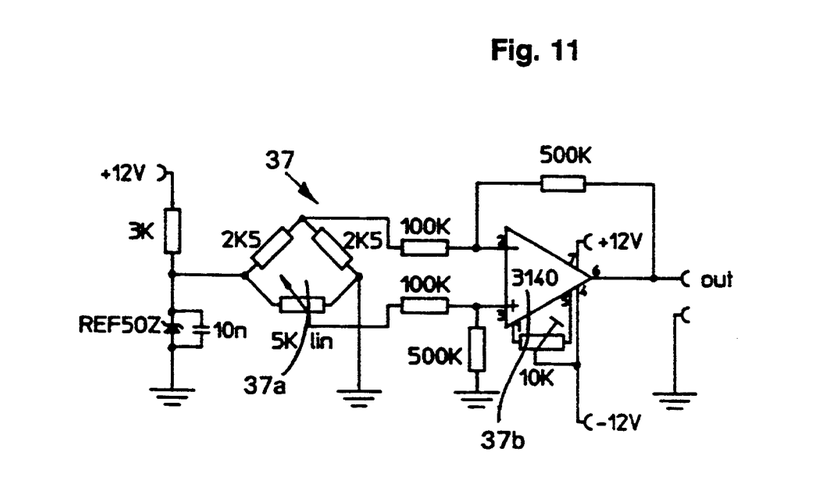
FIG. 11 is a circuit diagram of the orientation potentiometer circuit.

Vibration of the pig is measured with four piezoelectric accelerometers 50-53. A configuration is chosen which includes some redundancy so that independent checks can be made on the correct functioning of the accelerometers 50-53. Torsional vibration is calculated from the output of two parallel accelerometers 51,52 placed a short distance from each other. Small electrical charge signals are produced in use by the accelerometers 50-53 and are converted by four identical charge amplifiers 33 (located on one of two circuit boards 31 located at the rear of the pig) to voltage signals and these are amplified. The charge amplifier circuit 33 shown in FIG. 10 uses an operational amplifier 33a to achieve 40 mV/pC and a high pass filter cutoff of 3.4 Hz. The second circuit board 31 contains a charge amplifier for the accelerometer 24 mounted on the shaker weight 22 and also a circuit 37 for the orientation potentiometer. The orientation potentiometer circuit of FIG. 11 uses a Wheatstone bridge 37a and an operational amplifier 37b to give a sensitivity of 75 mV/°. It also contains a power supply circuit 39 (shown in FIG. 9) to convert the incoming 12 V power supply to a 0±12 volt power supply required by the charge amplifiers 33 and the orientation potentiometer circuit 37. The power supply circuit uses a commercially available chip 39a (type NMA1212D) to convert the 12 V DC supply. The steady 12 V DC power required to drive the electronics is supplied to the pig via a single core shielded cable 32c from outside the pipe.

The amplified voltage signals are transmitted, by means of the 6-core data cable 32b, to the data acquisition system 38 which includes a 16-channel data logger 34 (type 1703 from Cambridge Electronic Design) with an integral programmable filter 35 (type 1401 from Cambridge Electronic Design). The data-acquisition system is connected to a portable computer 36 (a PC using the Intel 80486 processor is used in this example). The computer 36 is used to instruct the data logger 34 to generate signals to control the amplitude and frequency of the excitation wave produced by the shaker 20 and these signals are transmitted, after amplification, to the pig through the cable 32a.

Figure 4:
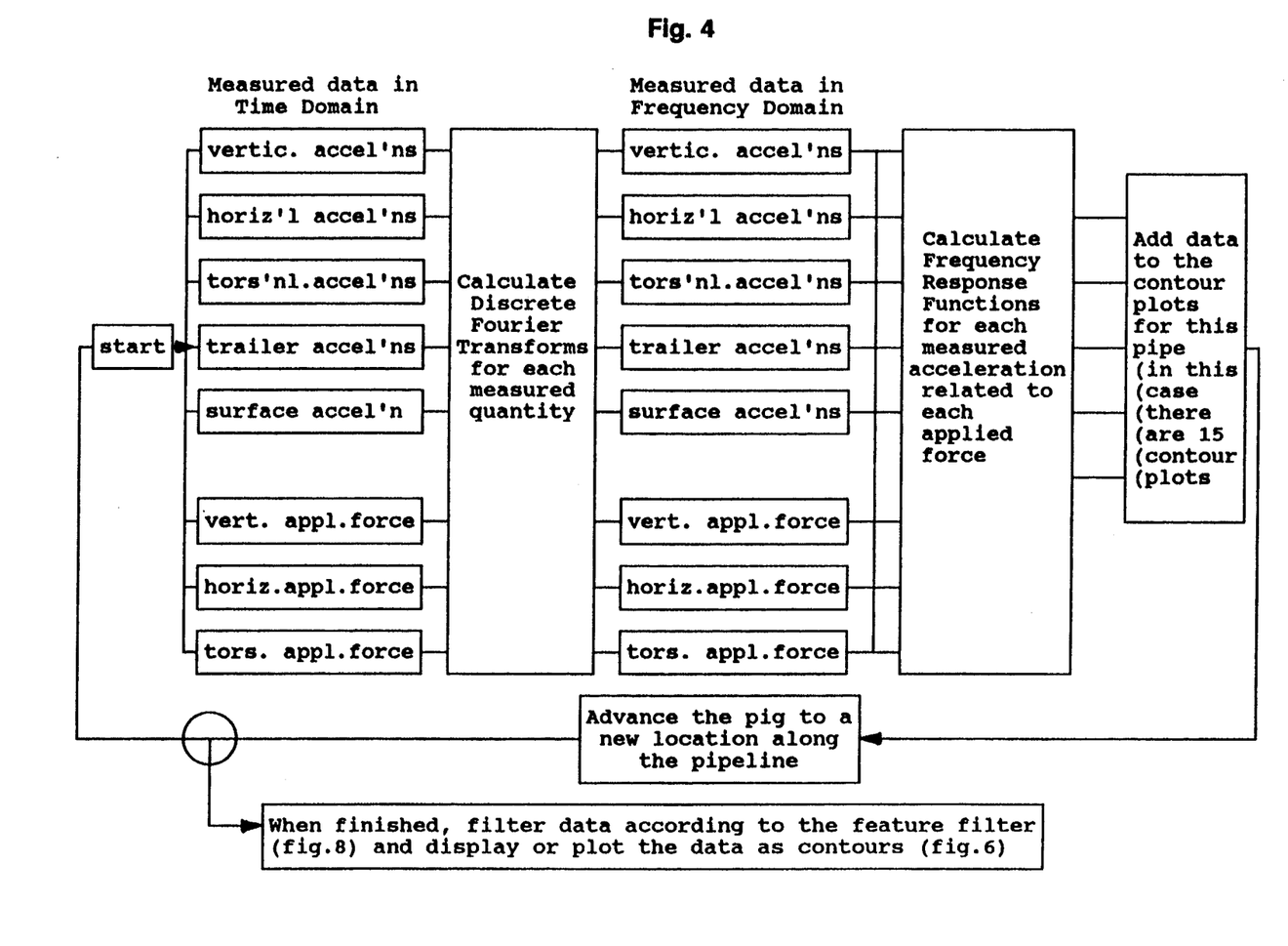
FIG. 4 is a block diagram of the method of displaying the results obtained from the pig.

The vibration data is displayed on the screen of the computer 36 in the form of contour plots (see FIGS. 5 and 6a–d) which are calculated using the algorithm described in the block diagram in FIG. 4. In this method, each measured signal is converted into its equivalent in the 'frequency domain' by calculating its discrete-Fourier transform (DFT). The DFT of each measured acceleration is normalised with respect to the DFT of the measured applied force so as to obtain frequency response functions (FRF's) of acceleration in response to an applied force (see *Random Vibration and Spectral Analysis* D. E. Newland, Longman Press 1984).

Figure 8:
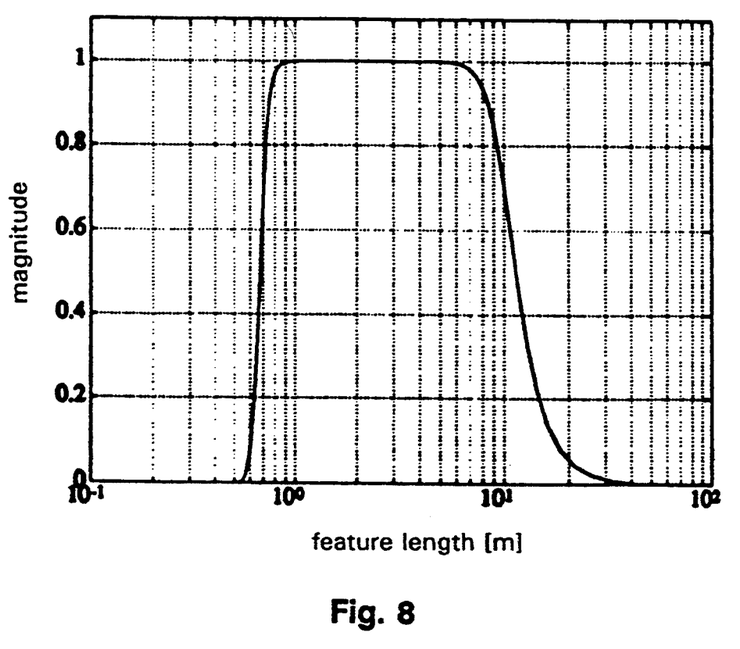
FIG. 8 is a graph showing the response function of a filter used in preparation of results; and, FIG. 9 is a circuit diagram of the on-board power supply on the pig.

FRF's are calculated for each of the modes of vibration (lateral, torsional etc.) at each of a number of positions along the pipeline. FRF's are measured along the length of a section of pipeline and are assembled into a 2-dimensional FRF dependent on frequency and distance down the pipe. This FRF is filtered in the distance coordinate in accordance with a feature filter response as shown in figure S, so as to ignore very slowly or very rapidly varying response with distance. Since the pig is only required for monitoring local changes over a few meters, global changes in FRF that occur gradually over several meters would spoil the information and the feature filter includes a high-pass filter to remove these effects. Similarly a low-pass filter is used to overcome any problems associated with bogus changes in FRF which occur at a single location, due, for example, to bad contact of the pig with the pipe. There is no downgrading of the pig's ability to detect very local external features as these result in changes in FRF over a length greater than the actual size of the feature itself and the filter cutoff is selected smaller than the length of these FRF changes.

A contour map of the two-dimensional FRF is plotted for each of the modes of vibration, as shown in FIGS. 6a–d. A theoretical discussion of aspects of the method employed in the present invention can be found in *Dynamic Condition Monitoring of Buried Gas Pipes*, Proceedings of Institute of Engineers, Australia, Mech '91 Conference, Sydney July 1991.

The contour maps show various FRF's as will now be described. Frequency of vibration and distance along the pipeline are plotted as the abscissae. The amplitude of the FRF is shown as a contour. It is of great interest to examine contours for all modes of vibration, even when excitation is chosen so as to act in one plane only. This gives a sensitive indication of asymmetry as a result of coupling between modes of vibration. As an example, a perfectly circular pipeline in a perfect and uniform soil will vibrate vertically and only vertically when subject to vertical excitation. In reality, the pipeline and its support are not perfectly symmetrical and there is a significant amount of measured horizontal and torsional vibration. The amount of these present are a much more sensitive measure of asymmetry and non-uniformity than the vertical response itself and are therefore an important diagnostic aid. For instance, there should be no torsional response (in theory) for the vertically excited pipeline shown in FIGS. 1,2 and 3, but variations with distance of the non-zero measured torsional response shown in FIG. 6b give a clear indication that there are features present in the pipe.

Figure 6A:
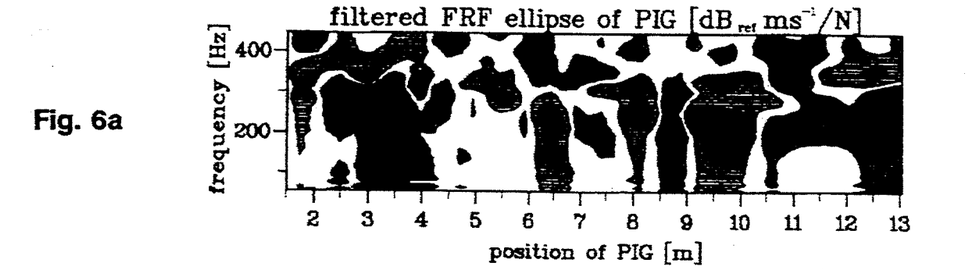
FIGS. 6a-d are black & white copies of colour contour maps of results obtained from investigation of a pipeline whose features are shown in FIG. 6e.
Figure 7:
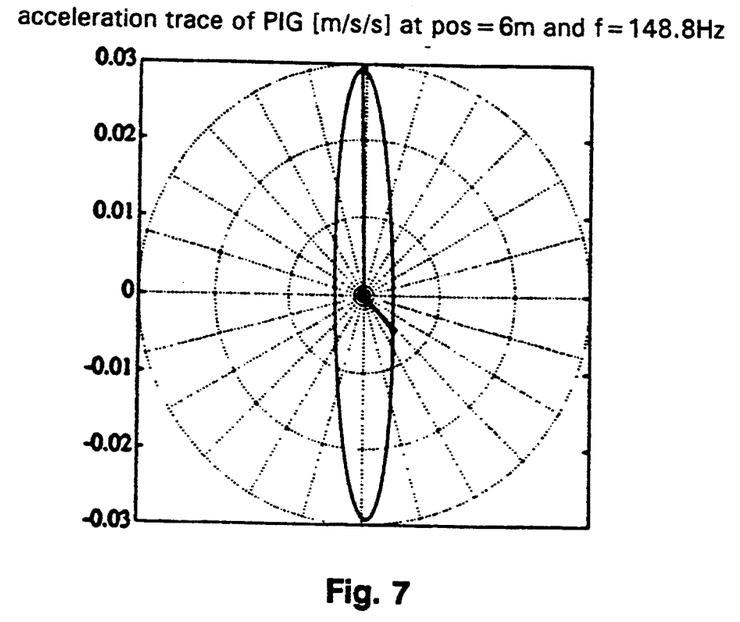
FIG. 7 is a trace of translational motion of the pig in pipe cross-section.

FIG. 6a shows the response due to vertical and horizontal vibration, referred to as "FRF ellipse", where the FRF is for the quantity $\sqrt{(a^2+b^2)}$, where a is the amplitude of vertical vibration and b is that of horizontal vibration. This can be seen in the elliptical trace of FIG. 7. The size of the ellipse $r=\sqrt{(a^2+b^2)}$. These two modes of vibration occurring simultaneously result in an elliptical path in general inclined at some angle to the vertical as can Just be seen in the figure. Horizontal motion is contained within the "FRF ellipse" so no separate contour plot is required for this.

Figure 6B:
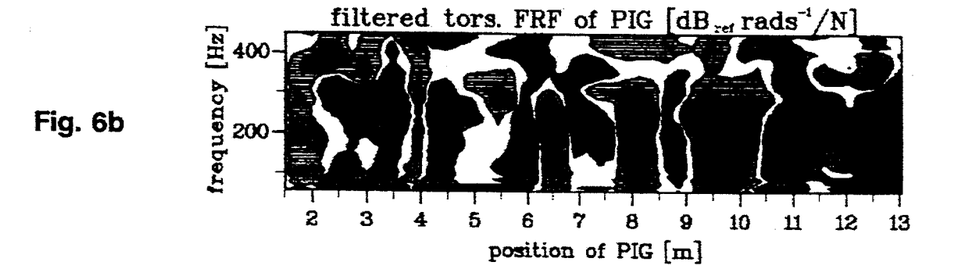

FIG. 6b illustrates the FRF of the torsional response measured by the pig.

Figure 6C:
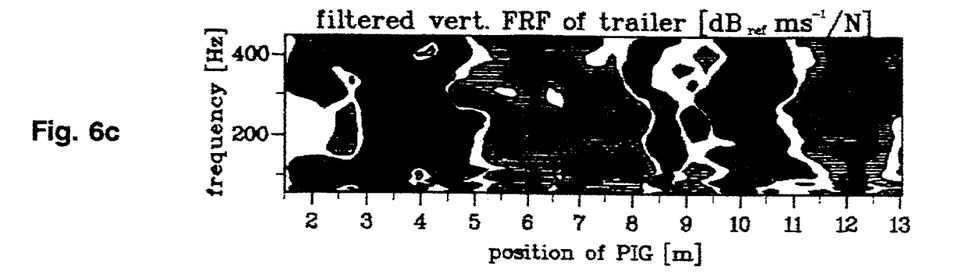

FIG. 6c illustrates the filtered FRF of the vertical response of a trailer pig.

Figure 6D:
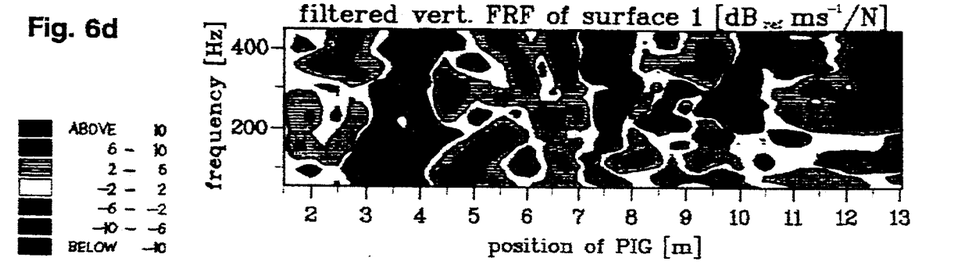
Figure 6E:
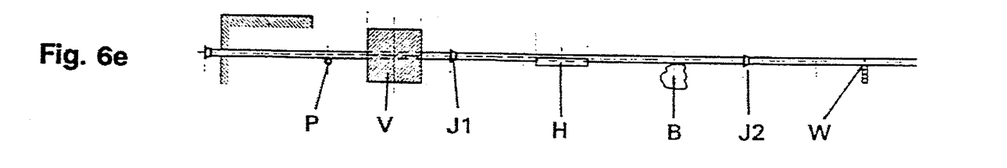

FIG. 6d illustrates "FRF surface", or the FRF of vertical acceleration measured on the ground immediately above the pipeline at the position of the pig along the pipeline and is not required for normal service (being measured independently by an accelerometer which is not shown), but has been used for development purposes. FIGS. 6a–d are shown in registration over a diagrammatic representation (FIG. 6e) of the pipeline 2 through which the pig 1 was passed and the surrounding features in order to obtain the FRF contour maps. FIGS. 6a and 6b in particular illustrate how the features around the pipeline may be sensed by the technique employed in the present invention. FIG. 6e illustrates the following features around the pipe: a crossing pipe P; a void V, a pipe join $J_1$; a hard spot H; a boulder B; a further join $J_2$; and a wall W.

The units in which FRF is plotted in FIGS. 6a–d are in dB (decibels) where dB=20 log$_{10}$ ($^{signal}/_{reference}$) and a scale is shown beside FIG. 6d. The heading of each contour plot indicates the value of this reference, For example, $-20$ dB$_{re}$/ms$^{-1}$/N indicates a response velocity of 0.1 ms$^{-1}$ per Newton of applied force.

Figure 5:
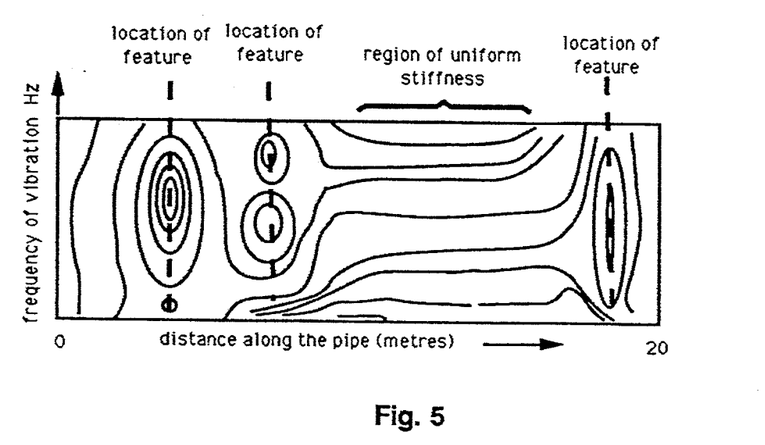
FIG. 5 is a representation of sample results as displayed.

In the dummy plot of FIG. 5, the left-most feature can be identified as a "mountain" on the contour plot. This indicates increased response and therefore a softening of the surrounding soil or a weakening of the pipe. The adjacent feature may be a "depression" in the contour plot, indicating the presence of a hard spot. The region of uniform stiffness represents "the norm" and is a useful reference base-line response. The right-most feature, if a "mountain" represents a soft spot, or if a "valley" represents a hard spot. It is necessary to use a colour code or to indicate contour "heights" numerically in order to show such plots without ambiguity.

We claim:

1. A method of monitoring the structural condition of a pipeline and its support, the method including the steps of:
    traversing the interior of the pipeline with a pig;
    causing the pig to vibrate in at least one of the vertical, longitudinal, lateral, bending and torsional senses;
    transmitting the vibrations into the wall of the pipeline;
    measuring the vibration response of the pipeline by detecting at least one of the vertical, longitudinal, lateral, bending and torsional motions of the pig; and
    displaying and/or recording the measured data in a form which can be used to identify variations in the structural condition of the pipeline and its support.

2. A method according to claim 1, further including monitoring the vibrational motion of a further trailing pig to provide further data.

3. A pipeline pig comprising:
    means for causing the pig to vibrate in at least one of the vertical, longitudinal, lateral, bending and torsional senses:
    means for transmitting the vibrations into the wall of a pipeline through which it is moved;
    means for measuring the vibration response of the pipeline by detecting at least one of the vertical, longitudinal, lateral, bending and torsional motions of the pig.

4. A pipeline pig according to claim 3, wherein the means for causing the pig to vibrate comprises an electromagnetic shaker or counter-rotating masses.

5. A pipeline pig according to claim 3, wherein the means for transmitting the vibrations into the wall of the pipeline comprises a casing and a plurality of feet.

6. A pipeline pig according to claim 3 wherein the pig has a plurality of feet arranged in a triangular distribution.

7. A pipeline pig according to claim 3, wherein the means for measuring the vibration response of the pipeline comprises a plurality of accelerometers arranged to detect at least one of the vertical, longitudinal, lateral, bending and torsional motions of the pig.

8. A pipeline inspection apparatus including
    a pipeline pig according to claim 3; and
    means for displaying and/or recording the measured data in a form which can be used to identify variations in the structural condition of the pipeline and its support.

9. Apparatus according to claim 8, including a further pig attached to the first pig so as to follow it when it is drawn through a pipeline, the second pig also having means for measuring the vibration response of the pipeline by detecting at least one of the vertical, longitudinal, lateral and torsional motions of the second pig in response to vibrations generated in the first pig.

10. Apparatus according to claim 8, wherein the means for displaying and/or recording the measured .data comprises a data logger and a computer, the computer being arranged to display, or print contour maps representing the data received from the pig.

11. A pipeline pig according to claim 3 wherein the pig has at least three feet.

12. A pipeline pig according to claim 3 wherein the pig has a center of gravity below a central axis thereof.

* * * * *